Sept. 27, 1966  R. L. RENFROE  3,274,657
SAFETY CLAMP
Filed March 5, 1964  2 Sheets-Sheet 1
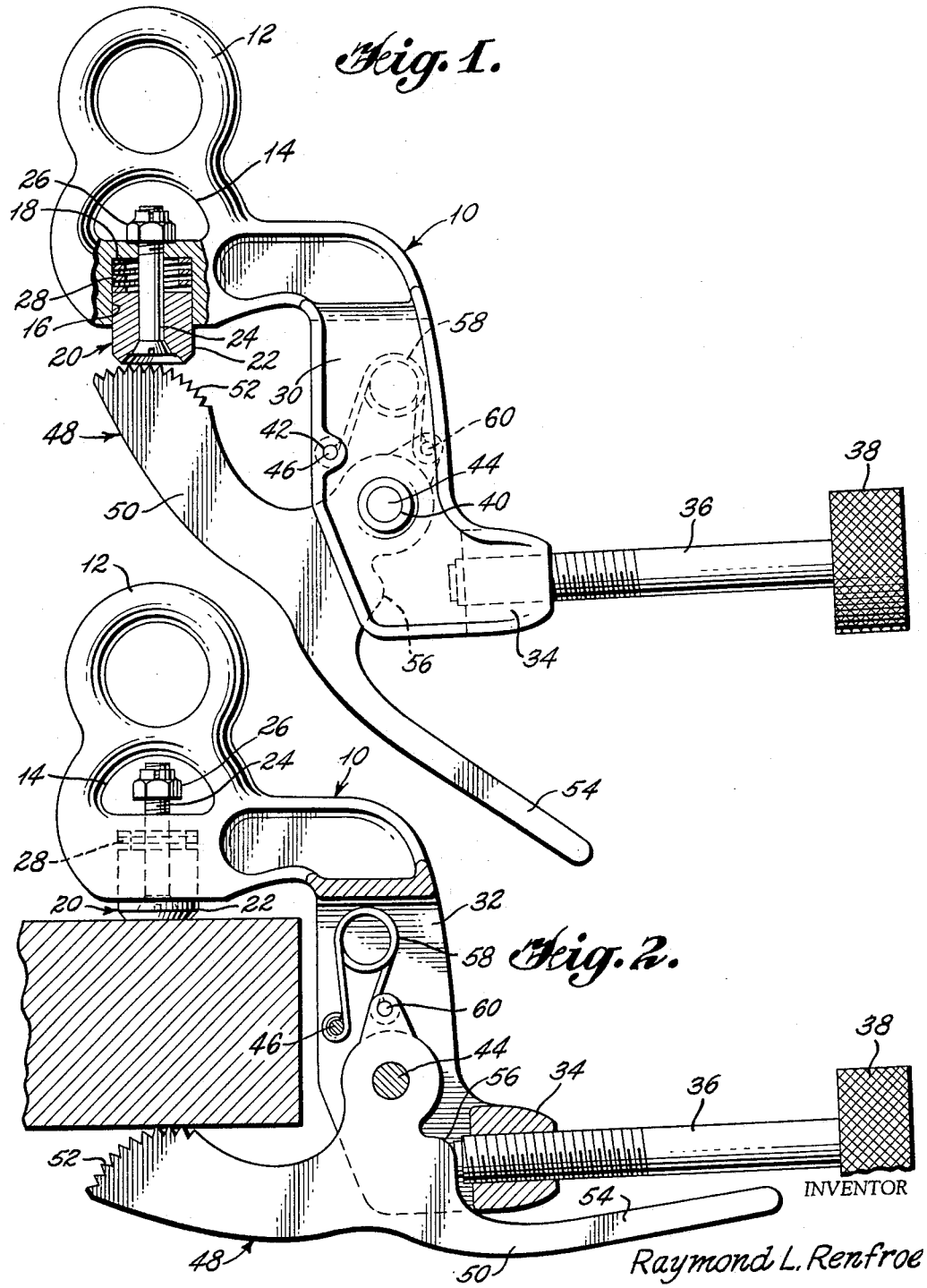
INVENTOR
Raymond L. Renfroe
BY Irons, Birch, Swindler & McKie
ATTORNEYS

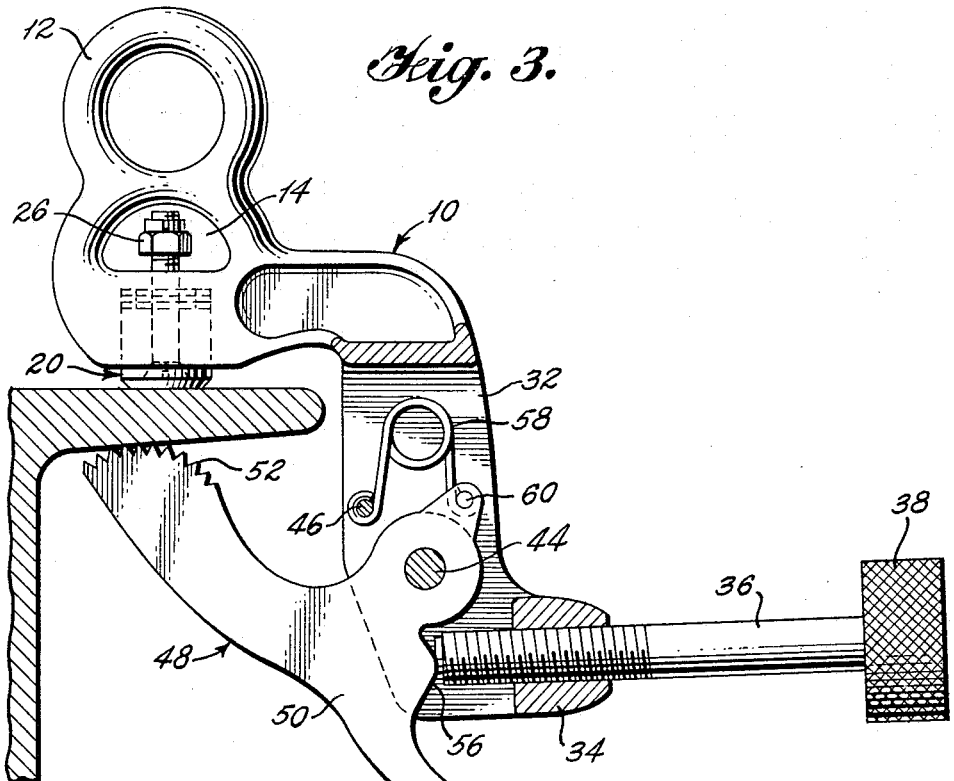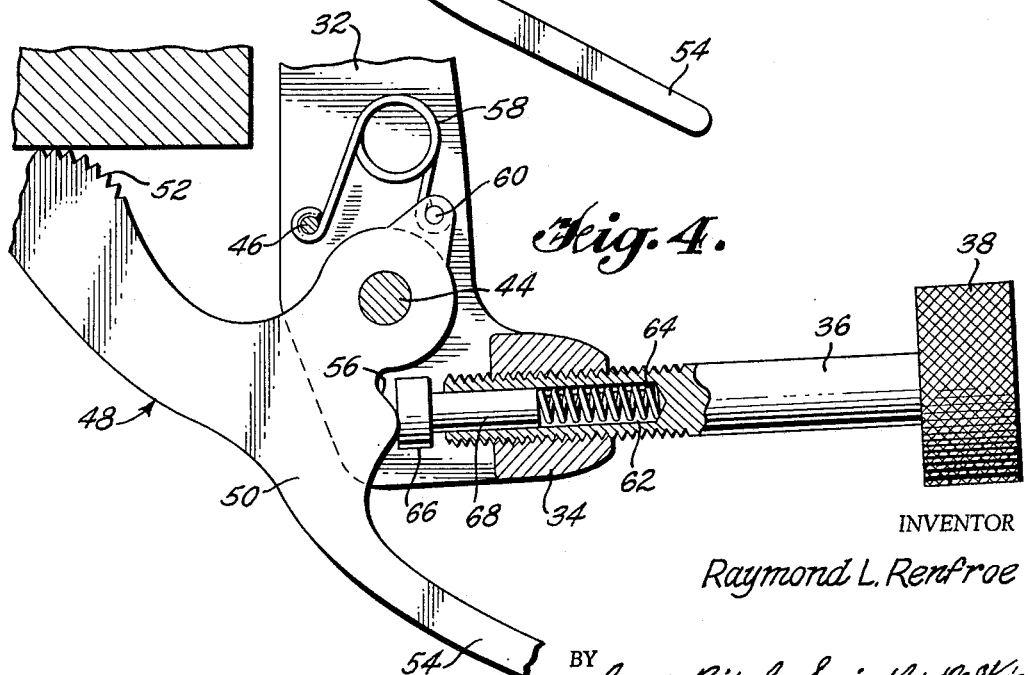

United States Patent Office 3,274,657
Patented Sept. 27, 1966

3,274,657
SAFETY CLAMP
Raymond L. Renfroe, Jacksonville, Fla., assignor to J. C. Renfroe & Sons, Inc., Jacksonville, Fla., a corporation of Florida
Filed Mar. 5, 1964, Ser. No. 349,722
10 Claims. (Cl. 24—248)

This invention relates to a clamp and more particularly to a safety clamp which may be connected to a workman by a safety line and firmly secured to a structural member such as an I beam.

Workmen frequently are required to work at high and dangerous places in the construction and repair of buildings, bridges and the like. In such circumstances the workers are required to use both hands in their work and to move about freely from place to place. Such procedures are extremely dangerous, and if the worker is thrown off balance or slips, the resulting fall may result in serious if not fatal injury.

While various safety clamps for individual workers have been proposed in the past, none have proved completely satisfactory. Some such prior devices have consisted of brackets which are placed over a beam or other support member. These brackets are not firmly secured to the beam and are likely to come loose or to jerk loose during the fall of the workman. Ordinary clamps have also been found to be unacceptable as safety clamps since they generally require both hands to operate, and frequently require that the force to be applied to them be applied in a given direction whereas the safety clamp must remain secure regardless of the angle of force applied by the safety line. Further, many prior art clamps require considerable time to attach and remove which is a serious disadvantage due to the frequency with which the workers must move. The result is either loss of productive time or failure to use the safety clamp.

To overcome the disadvantages of the prior art clamps it is an object of this invention to provide an improved clamp which may be quickly and securely attached to and removed from a beam or similar purchase.

Another object of this invention is to provide an improved safety clamp which may be attached to or removed from a purchase with the use of only one hand. A still further object of this invention is to provide an improved safety clamp which will hold fast after proper attachment regardless of the position of the purchase and regardless of the angle of force applied to the clamp by the safety line.

Further objects and advantages of this invention will become apparent from the following description and drawings.

Broadly, the invention relates to a safety clamp adapted to be operated with one hand and to be quickly and securely attached to and removed from a purchase, comprising a light portable clamp body, connection means on said body for attachment to a safety line, a first jaw mounted on said body, a second jaw movably mounted on said body, for movement between open and closed positions relative to said first jaw, spring means biasing said second jaw from said open position to said closed position, manually operable handle means connected to said second jaw to move said second jaw to said open position, and manually operable locking means movable between a locked position engaging said second jaw to positively retain said second jaw in said closed position and an unlocked position in which said second jaw can be moved by said handle means to said open position against the face of said spring means and then moved to said closed position by said spring means when said handle means is released. Preferably, said second jaw includes an arm, a cam shoulder integrally formed on said arm, a gripping edge on one end of said arm and spaced from said cam shoulder, and means intermittent said gripping edge and said cam shoulder for pivotally mounting said gripping jaw.

The invention having been generally described, the preferred specific embodiments will be discussed in detail with reference to the accompanying drawings.

FIGURE 1 is a side elevation, partially in section, of a clamp constructed according to the principles of the present invention and showing the clamp in its relaxed position.

FIGURE 2 is a side elevation, partially in section, of the clamp of FIGURE 1 with the clamp secured to a purchase.

FIGURE 3 is a side elevation, partially in section, of the clamp of FIGURE 1 with the clamp secured to a relatively thin purchase.

FIGURE 4 is a side elevation, partially in section, of a modification of the clamp shown in FIGURE 1.

A clamp body 10 has an eye 12 integrally formed on one end thereof. An opening 14 is formed in the body immediately beneath eye 12 and a recess 16 having a base 18 is formed in the clamp body 10 immediately beneath opening 14. A swivel jaw generally 20 is mounted in recess 16. The swivel jaw includes a head member 22, and a rod 24, which is connected to head member 22 and extends through an opening in the base 18 of recess 16. The end of rod 24 is threaded and is secured to a nut 26 which prevents rod 24, and hence head member 22, from being withdrawn from the recess. A coil spring 28 is interposed between base 18 and head member 22.

The lower end of clamp body 10 is bifurcated and contains two legs 30 and 32. A threaded nut 34 is formed in the ends of the two legs 30 and 32 and threadably receives bolt 36 which has a knurled head 38. Each of legs 30 and 32 contains a pair of openings 40 and 42. Pivot pins 44 and 46 are mounted in openings 40 and 42, respectively, and extend between the two legs 30 and 32 of clamp body 10. A moving jaw, generally 48, is pivotally mounted between legs 30 and 32 on pivot pin 44. The moving jaw is comprised of an arm 50 having a serrated gripping edge 52 on one end and a handle 54 on the other end. A cam shoulder 56 is integrally formed on arm 50 and is adapted to cooperate with the end of bolt 36. A spring 58 is connected to pivot pin 46 and to a slot 60 on arm 50.

In operation, the worker's safety line, which is connected to the worker by means of a conventional safety belt or the like, is fastened to the clamp through eye 12. When not in use the clamp may be carried in a holster or the like fastened to the safety belt. When the worker is in the place where he desires to work, he removes the clamp from the holster, gripping handle 54 and bolt 36 in one hand. He then squeezes handle 54 against bolt 36. This pressure causes arm 50 to pivot about pivot pin 44 moving the serrated gripping edge 52 away from swivel jaw 20. With the jaws in this open position the worker places the clamp in position with one jaw on each side of the purchase. He then releases the handle and the force of spring 58 pivots arm 50 clockwise urging the gripping edge 52 against the purchase. The strength of spring 58 is sufficient to hold the clamp on the purchase and allows the worker to turn bolt 36 with one hand without having to hold the clamp with the other hand. Thus one hand is free to hold on at all times.

As bolt 36 moves forward through nut 34 the forward end of the bolt comes into contact with cam shoulder 56. The continued forward movement of the bolt pivots arm 50 about pivot pin 44 and urges gripping edge 52 firmly and securely against the purchase. As the gripping jaw 48 exerts pressure on the purchase, coil spring 28 of swivel jaw 20 is compressed. The workman continues turning bolt 36 until coil spring 28 is completely compressed and serrated gripping edge 52 of jaw 48 is locked in firm engagement with the purchase. As may be seen by comparing FIGURES 1, 2 and 3 the gripping jaw 48 is designed to open and close from minimum to maximum jaw opening capacity while always keeping its gripping edge 52 in line with the swivel jaw 7. As also may be noted from these three figures the cam shoulder 56 is so designed as to allow the shoulder to be properly engaged by the forward end of bolt 36 when the clamp is on purchases of various thicknesses.

With the swivel jaw 20 retracted within the recess 16 and the coil spring 28 being under pressure the clamp will not be able to work loose. Even if the gripping edge 52 of the gripping jaw 48 should dig into the purchase after the bolt 36 has been firmly set, coil spring 28 would expand, urging the swivel jaw head 22 outwardly taking up any looseness in the grip.

When the workman desires to release the clamp he merely unscrews bolt 36 sufficiently to allow coil spring 28 to extend to its fullest extent and to leave a little space between the cam shoulder 56 and the end of bolt 36. The worker may then squeeze handle 54 toward bolt 36. This force overcomes the force of spring 58 and allows the jaws to be opened sufficiently to remove the clamp from the purchase.

In the modification as illustrated in FIGURE 4, bolt 36 has a recess 62 in its forward end. A coil spring 64 is positioned in the recess and a slideable extension 68, having a cam engaging head 66, is mounted in recess 62 with the rearward end of slideable extension 68 in engagement with coil spring 64. In operation the turning of bolt 36 initially urges the gripping jaw 48 against the purchase and then, before increased pressure is applied to the purchase, coil spring 64 is compressed bringing head 66 firmly against the forward end of bolt 36. As the turning of bolt 36 continues, the pressure exerted through head 66 urges gripping jaw 48 firmly against the purchase. This feature provides another safety factor in keeping the clamp firmly secured to the purchase once the clamp has been set. If the clamp should tend to become loose from the purchase, the combined forces of both spring 28 and spring 64 would urge the two jaws once again firmly against the purchase. Alternatively, the sliding cam engaging head could be used with a clamp which does not have a retractable swivel jaw, with spring 64 acting alone to keep the jaws firmly against the purchase. The sliding cam engaging head feature could also be used in place of spring 58, since spring 64 could initially provide a yieldable force to hold the clamp firmly on the purchase prior to the locking of the jaws by the turning of bolt 36.

As may be seen from the above description and drawings, the clamp of this invention may be secured to a variety of purchases which may be at any angle to the horizontal. In all these positions there is a positive grip in a direct line between the two clamp jaws and the clamp will hold fast regardless of the direction of the force applied to the eye. Further, the clamp may be operated with only one hand, leaving the other hand free to hold on, and the clamp cannot be opened accidentally since a purposeful force is required to unscrew bolt 36.

Many other modifications and variations of this invention will become readily apparent to those skilled in the art and only such limitations should be applied to the invention as appear in the appended claims.

What is claimed is:

1. A safety clamp adapted to be operated with one hand and to be quickly and securely attached to and removed from a structural member comprising: a light portable clamp body; connection means on said body for attachment to a safety line; a first jaw mounted on said body; a second jaw movably mounted on said body for movement between open and closed positions in relation to said first jaw, said jaws having gripping surfaces defined by pointed protrusions adapted to bite into the structural member; spring means biasing said second jaw from said open position to said closed position; manually operable means connected to said second jaw for moving said second jaw to said open position; manually operable locking means mounted on said body in cooperative relation to said second jaw for positively urging said second jaw toward said first jaw; and grip means connected to said body closely adjacent and opposite said first named manually operable means to facilitate one hand operation of the safety clamp.

2. A safety clamp for attaching an individual worker's safety line to a structural member which comprises: a light portable clamp body; connection means on said body for attachment to the safety line; a first jaw mounted on said body; a second jaw movably mounted on said body for movement between open and closed positions relative to said first jaw, said jaws having gripping surfaces defined by pointed protrusions adapted to bite into the structural member; manually operable handle means connected to said second jaw to move said second jaw to said open position; spring means biasing said second jaw from said open position to said closed position; manually operable locking means movable between a locked position engaging said second jaw to positively retain said second jaw in said closed position and an unlocked position in which said second jaw can be moved by said handle means to said open position against the force of said spring means and then moved to said closed position by said spring means when said handle means is released; and grip means connected to said body closely adjacent and opposite said handle means to facilitate one hand operation of the safety clamp.

3. The clamp of claim 2 wherein said locking means comprises: a bolt threaded in said body with one end in cooperative relation to said second jaw and said grip means is defined at least in part by the other end of said bolt extending beyond said body in the proximity of said handle means whereby said bolt and said handle means may be gripped in one hand.

4. The clamp of claim 2 wherein said locking means comprises: engaging means; spring means operatively associated with said engaging means for yieldably urging said engaging means against said second jaw to urge said second jaw to said closed position; and a bolt mounted on said body for locking said engaging means against said second jaw and to thereby positively retain said second jaw in said closed position.

5. A safety clamp for attaching an individual worker's safety line to a structural member which comprises: a light portable clamp body; a connecting means on said body for attachment to the safety line; a first jaw mounted on said body; a second jaw movably mounted on said body for movement between open and closed positions relative to said first jaw; said jaws having gripping surfaces defined by pointed protrusions adapted to bite into the structural member; said second jaw including an arm and a cam shoulder integrally formed on said arm, a gripping surface of said second jaw being spaced from said cam shoulder on one end of said arm; manually operable locking means movable between a locked position engaging said cam shoulder to positively retain said second jaw in said closed position, and an unlocked position spaced from said cam shoulder in which said second jaw can be moved to said open position; separate manually operable means connected to said second jaw for moving said second jaw to said open position; and grip means connected to said body closely adjacent and opposite said separate manually operable means to facilitate one hand operation of the safety clamp.

6. The clamp of claim 5 wherein said locking means comprises a bolt threaded in said body with its forward end in line with said cam shoulder.

7. The clamp of claim 5 wherein said locking means comprises: a bolt threaded in said body and having a recess in its forward end; a cam engaging means slidably mounted in said recess; and spring means mounted in said recess to urge said cam engaging means against said cam shoulder.

8. The clamp of claim 5 wherein said body has a recess in one end; said recess has a base with an opening therein; and said first jaw is a swivel jaw mounted in said recess in said body and includes a head member, a rod connected to said head member and extending through said opening in said base, means secured to the end of said rod for preventing said rod from being withdrawn through said opening, and spring means mounted in said recess between said head member and said base for biasing said head member out of said recess.

9. A safety clamp for attaching an individual worker's safety line to a structural member and adapted to be quickly and securely attached to and removed from a structural member with one hand comprising: a light portable clamp body; connecting means on said body for attachment to the safety line; a first jaw mounted on said body; a second jaw movably mounted on said body for movement between open and closed positions relative to said first jaw, said jaws having gripping surfaces defined by pointed protrusions adapted to bite into the structural member, said second jaw including an arm and a cam shoulder integrally formed on said arm, said gripping surface of said second jaw being spaced from said cam shoulder; spring means biasing said second jaw from said open position to said closed position; a manually operable handle connected to said second jaw for moving said second jaw to said open position; and locking means movable between a locked position engaging said cam shoulder to positively retain said second jaw in said closed position and an unlocked position in which said second jaw can be moved by said handle means to said open position against the force of said spring means and then moved to said closed position by said spring means when said handle is released; and grip means connected to said body closely adjacent and opposite said handle means to facilitate one hand operation of the safety clamp.

10. The clamp of claim 9 wherein said body has a recess in one end; said recess having a base with an opening therein; and said first jaw is a swivel jaw mounted in said recess in said body and includes a head member, a rod connected to said head member and extending through said opening in said base, means secured to the end of said rod for preventing said rod from being withdrawn through said opening, and spring means mounted in said recess between said head member and said base for biasing said head member out of said recess.

References Cited by the Examiner

UNITED STATES PATENTS

| | | | |
|---|---|---|---|
| 221,535 | 11/1879 | Davison | 294—104 X |
| 419,270 | 1/1890 | Low | 81—321 |
| 1,736,290 | 11/1929 | Schiff | 24—249 |
| 1,768,497 | 6/1930 | Willsea | 24—248 |
| 2,350,961 | 6/1944 | Haskins | 24—248 X |
| 2,397,438 | 3/1946 | Schmid | 24—253 X |
| 2,411,319 | 11/1946 | Duarte | 294—104 |
| 2,501,238 | 3/1950 | Sarstard et al. | 81—367 X |
| 2,613,243 | 10/1952 | Frear | 24—248 X |
| 2,815,556 | 12/1957 | Neil | 24—248 |
| 2,852,300 | 9/1958 | Gardner | 294—104 |
| 3,017,154 | 1/1962 | Lill | 24—248 X |
| 3,189,377 | 6/1965 | Gardner | 294—104 X |

WILLIAM FELDMAN, *Primary Examiner.*

DONLEY J. STOCKING, *Examiner.*

D. GRIFFIN, *Assistant Examiner.*